Figure 1:
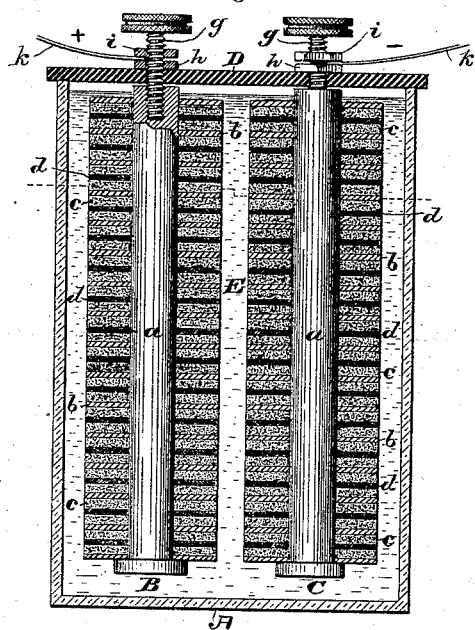

(No Model.)

W. A. SHAW.
SECONDARY BATTERY.

No. 316,409. Patented Apr. 21, 1885.

Attest:
Geo. T. Smallwood.
C. J. Hedrick.

Inventor:
Wm Anthony Shaw
by A. Pollok
his attorney.

UNITED STATES PATENT OFFICE.

WILLIAM ANTHONY SHAW, OF PITTSBURG, PA., ASSIGNOR TO THE ELECTRICAL ACCUMULATOR COMPANY, OF NEW YORK, N. Y.

SECONDARY BATTERY.

SPECIFICATION forming part of Letters Patent No. 316,409, dated April 21, 1885.

Application filed June 25, 1883. (No model.)

*To all whom it may concern:*

Be it known that I, WILLIAM ANTHONY SHAW, of Pittsburg, in the county of Allegheny and State of Pennsylvania, (formerly of Brooklyn, Kings county, New York,) have invented a new and useful Improvement in Secondary Batteries, which improvement is fully set forth in the following specification.

This invention has more particular reference to that class of secondary electric galvanic or voltaic batteries in which the active material on one or both plates or elements of the couples or cells is insoluble in the exciting-liquid or electrolyte, and remains therefore attached to the body or frame of the plate or element. By "active material" is to be understood the material which acts upon or is acted upon chemically by the exciting-liquid or electrolyte.

The invention consists, first, in forming the negative or the positive, or both the negative and positive, elements of a cell or couple of a series of separate disks or plates of conductive material electrically connected, so as to be of the same polarity, and provided with active material on their adjacent faces. This active material may be that of the disks or plates themselves, or it may be material applied thereto, or it may be partly the one and partly the other. It is preferred, however, to apply active material to the surfaces of the plates or disks, so as at once to obtain a large body of such material, and this is specifically claimed. The element is defined as being composed of separate disks or plates to distinguish it from a grooved plate which has the shelves or divisions all in one piece, and which is not broadly claimed herein, being reserved for another application. The use of separate plates or disks is advantageous in permitting the practical employment of thinner divisions or shelves, and also in facilitating the manufacture, particularly where the active material is to be mechanically applied.

The invention secondly consists in dividing the active material of a plate or element of a cell or couple (whether it is a positive or negative element) by a porous layer or layers of inactive material, (such, for example, as a sheet of felt or other fabric or the like) whereby freer access of the exciting-liquid to all parts of said material is permitted. This layer or these layers are to be distinguished from a mixture of inactive with the active material, since in the latter there is no division between the inactive and the active material, but the whole forms one conglomerate.

The invention thirdly consists in forming a plate or element with a number of conducting plates, disks, or shelves electrically connected, so as to be of the same polarity, and provided with active material on their adjacent surfaces, and in separating the active material of one plate, shelf, or disk from that of the adjoining one by a porous layer of inactive material. This part of the invention is not confined to the use of separate disks or plates, but their use is preferred. It is preferred, also, to apply active material to the surfaces of the shelves, plates, or disks.

The invention fourthly consists in making the body or frame of a plate or element of a series of shelves, division plates, or disks of conducting material, extending entirely around and electrically connected with a central conductor. Preferably the central conductor is in the form of a rod or tube.

The invention further comprises the union or combination of two or more of the above-recited improvements in a single element or plate.

The following description will enable those skilled in the art to which the invention relates to make and use the same, reference being had to the accompanying drawings, which form a part of this specification.

Figure 2:
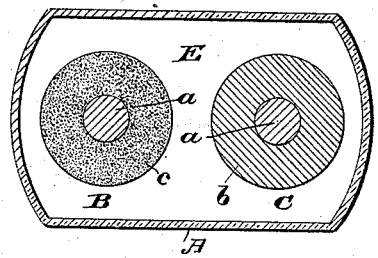

Figure 1 is a vertical section of a cell constructed in accordance with the invention, the section being through both elements or plates; Fig. 2, a horizontal section of the same on the dotted line, Fig. 1; and Fig. 3, a vertical section of another form of cell, also constructed in accordance with the invention.

A, Figs. 1 and 2, is the containing-vessel, of glass or other suitable material, and of an oblong rectangular form, or other suitable form may be used; B, the negative plate or element; C, the positive plate or element; D, the cover of the cell, and E the exciting-solution or electrolyte. In these figures both elements or plates are of the same construction, and consist each of a central conductor, *a*, in the form of a rod, a series of separate disks or plates, *b*, coated on both sides with active material *c*, in the form of red lead or other suitable form, and strung on said central conductor with a porous layer, *d*, of inactive material, in the form of one or more sheets of felted or woven fabric, of paper or the like, or in other suitable form, interposed between the active material on the disks or plates. The central conductor and the disks or plates are preferably of lead, although they may be of other suitable metal or conductive material. As shown, the plates or elements are suspended in the exciting-liquid from the cover D of the cell, (which cover is of insulating material—such as vulcanite,) and, being upright, the disks or plates form a series of shelves. It is not essential, however, that the elements should be upright, since it is obvious that they may be placed on their sides or in other suitable position.

The means shown for connecting the elements with the cover and binding-post form no part of the invention. They consist of a screw, *g*, fixed at the lower end in the central conductor and projecting through the cover, a nut, *h*, thereon, and a second nut, *i*, for binding the external conductor, *k*.

The signs plus and minus indicate the positive and negative poles of the cell and also the poles of the charging-generator with which the respective elements are connected, these being of like name. The negative plate or element of the cell or couple is connected with the positive pole, and vice versa.

Figure 3:
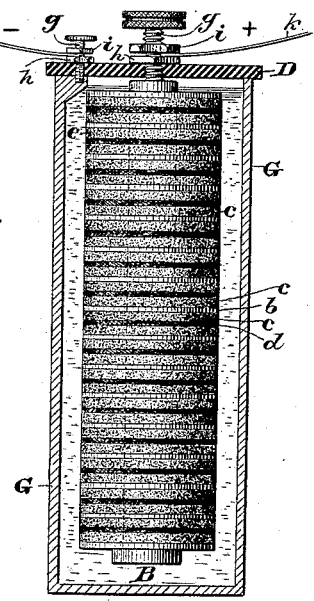

In Fig. 3 the negative element, constructed as before described, is suspended in a section of tube, or in a vessel, G, of lead or other suitable conducting material, which serves both as the containing-vessel and as the positive element or plate. It is obvious that two or more negative elements could be suspended in such a vessel, itself constituting an element; also, that the containing-vessel, when made of lead or other suitable material, might be made the negative instead of the positive pole.

The electrolyte or exciting-liquid is preferably a ten-per-centum solution of sulphuric acid in water, although other excitants—for example, a saturated solution of nitrate of potash or bichromate of potash—could be used.

Modifications may be made in details without departing from the spirit of the invention, and portions of the invention could be used separately.

A number of separate plates or disks could be assembled, and these be coated with active material. For example, a number of lead disks may be strung in a conducting-rod, with smaller disks of porous fabric between adjacent disks, and the annular spaces formed by the edges of the leaden disks projecting beyond the fabric can be filled with active material in the form, say, of a paste of red lead. An electrode of this kind, to be inclosed in a leaden tube as the opposing electrode, is shown and described, but not specifically claimed, in my application for improvement in transmitting and distributing electrical energy, filed April 21, 1882, and officially numbered 59,021. The present application may therefore be considered in part a division of said application.

Having now fully described my said invention and the manner of carrying the same into effect, what I claim is—

1. An element for a secondary cell or couple, composed of a series of separate plates or disks provided with active material on the adjacent surfaces, assembled side by side and electrically connected, so that each plate is of the same polarity as the plate or plates adjacent thereto on either side, substantially as described.

2. An element for a secondary cell or couple, formed of a series of separate plates or disks coated on the adjacent faces with active material, assembled side by side and electrically connected, so that each plate is of the same polarity as the plate or plates adjacent thereto on either side, substantially as described.

3. In an element for a secondary cell or couple, active material of the same polarity divided by one or more porous layers of inactive material, substantially as described.

4. An element for a cell or couple of secondary battery, comprising a body or frame with a series of shelves, disks, or plates provided on adjacent surfaces with active material separated by porous layers of inactive material, substantially as described.

5. A body or conducting-frame for an element of a secondary cell or couple, having a series of shelves, disks, or plates projecting from and extending entirely around a central conductor, substantially as described.

6. A body or conducting-frame for an element of a secondary cell or couple, comprising a central conductor in the form of a rod, and a series of shelves or division-plates projecting from and extending entirely around said rod, substantially as described.

7. An element for a cell or couple of secondary battery, comprising a central conductor with a series of shelves or division-plates projecting from and extending entirely around said conductor, and layers of active material between said shelves or division-plates, substantially as described.

8. In a secondary battery, an element of a cell consisting of a number of conducting plates or disks combined with interposed porous layers, and also with active material, and electrically connected, so as to be of the same polarity, said element being arranged or disposed with respect to the opposing element so that the edges of said plates or disks are presented to said opposing element, substantially as described.

In testimony whereof I have signed this specification in the presence of two subscribing witnesses.

WM. ANTHONY SHAW.

Witnesses:
  A. POLLOK,
  PHILIP MAURO.